(12) United States Patent
Chang

(10) Patent No.: US 8,683,744 B2
(45) Date of Patent: Apr. 1, 2014

(54) EXPANDABLE FLOWERPOT

(76) Inventor: Hsiao-An Chang, Taipei County (TW)

( * ) Notice: Subject to any disclaimer, the term of this patent is extended or adjusted under 35 U.S.C. 154(b) by 277 days.

(21) Appl. No.: 13/010,792

(22) Filed: Jan. 21, 2011

(65) Prior Publication Data
US 2012/0186148 A1  Jul. 26, 2012

(51) Int. Cl.
*A01G 9/02* (2006.01)

(52) U.S. Cl.
USPC .................. 47/81; 47/41.01; 47/82

(58) Field of Classification Search
USPC ........ 47/41.01, 79, 81, 82, 83, 86, 48.5, 66.1, 47/66.6
See application file for complete search history.

(56) References Cited

U.S. PATENT DOCUMENTS

| | | | | |
|---|---|---|---|---|
| 2,659,180 | A * | 11/1953 | Acton | 47/81 |
| 4,295,296 | A * | 10/1981 | Kinghorn | 47/82 |
| 4,380,136 | A * | 4/1983 | Karpisek | 47/83 |
| 4,546,571 | A * | 10/1985 | Scrivens | 47/81 |
| 4,593,490 | A * | 6/1986 | Bodine | 47/79 |
| 5,367,823 | A * | 11/1994 | Ferris | 47/39 |
| 7,832,146 | B2 * | 11/2010 | Gordon | 47/79 |
| 8,250,804 | B2 * | 8/2012 | Chang | 47/39 |
| 2009/0000189 | A1* | 1/2009 | Black | 47/82 |
| 2011/0192084 | A1* | 8/2011 | MacKenzie | 47/83 |

FOREIGN PATENT DOCUMENTS

| | | | | | |
|---|---|---|---|---|---|
| GB | 2096443 | A | * | 10/1982 | A01G 9/00 |
| JP | 06292473 | A | * | 10/1994 | A01G 27/00 |
| JP | 07227146 | A | * | 8/1995 | A01G 9/02 |
| JP | 10164993 | A | * | 6/1998 | A01G 9/02 |
| JP | 2000262150 | A | * | 9/2000 | A01G 9/02 |
| JP | 2003325052 | A | * | 11/2003 | A01G 9/02 |
| JP | 2007197993 | A | * | 8/2007 | |

OTHER PUBLICATIONS

Machine translation of JP 2000262150 to Toyoda et al., published Sep. 2000.*

* cited by examiner

*Primary Examiner* — Rob Swiatek
*Assistant Examiner* — Kathleen Alker

(57) ABSTRACT

A power-saving flowerpots capable of serial connecting with other flowerpot includes a planting tank having a horizontal plane and an inclined plane at an upper side thereof for planting; a water tank connected to a lower side of the planting tank; the connection of the planting tank and the water tank being formed as an L shape; an interior of the water tank being formed with a water draining channel; an upper side of the water draining channel being formed with a communication hole so that when the water level in the water tank is over a lower edge of the communication hole; water will flow into the communication hole from the water tank. A plurality of flowerpot can be installed as a first row by a retaining rod to pass through all hooks of the flowerpots; and the water tubes of the flowerpot are connected one by one.

1 Claim, 6 Drawing Sheets

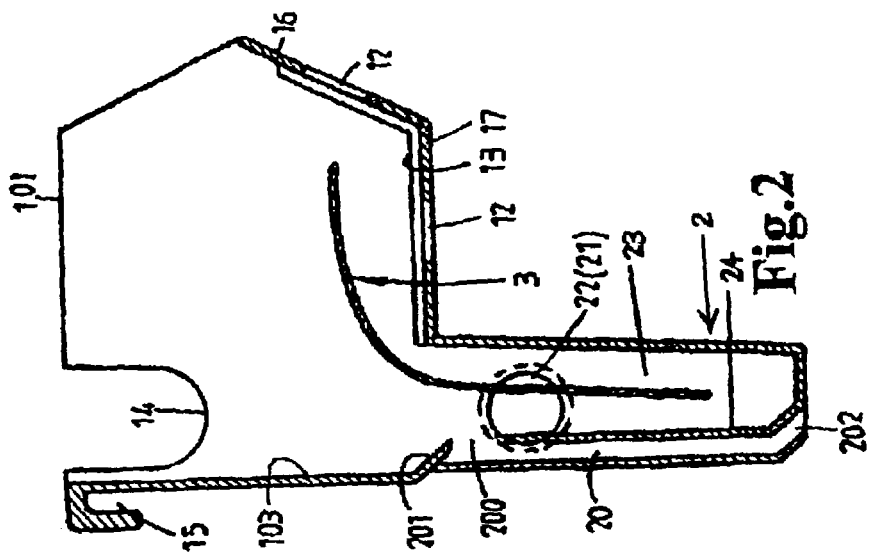
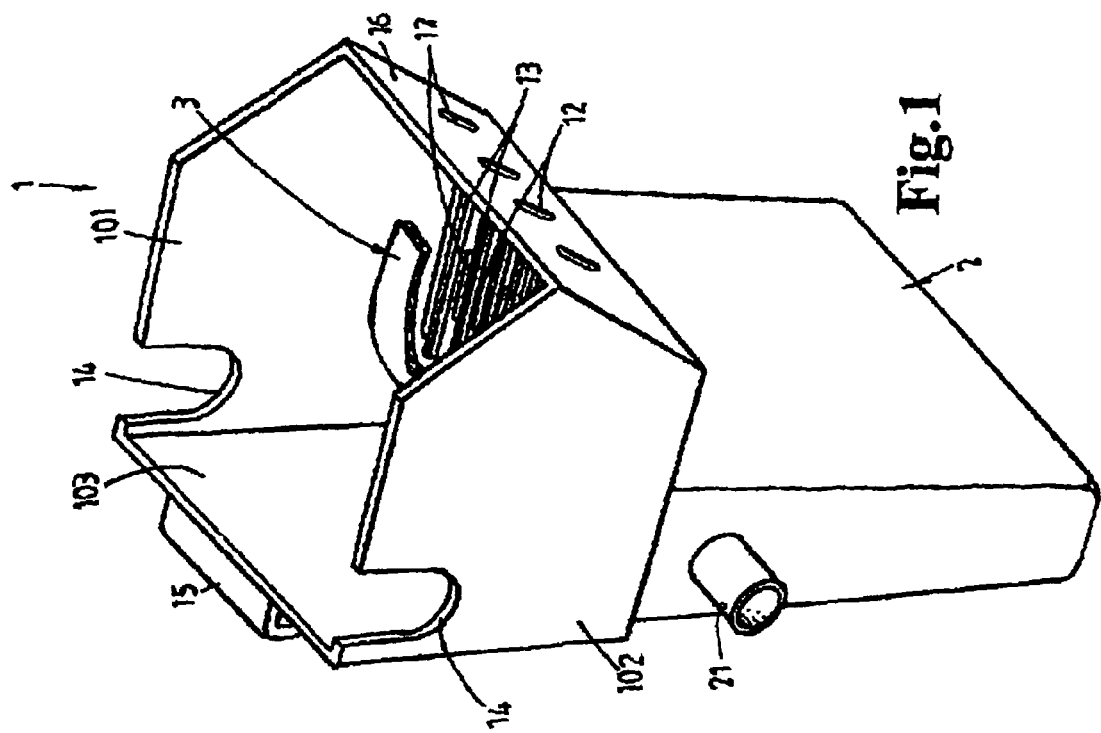

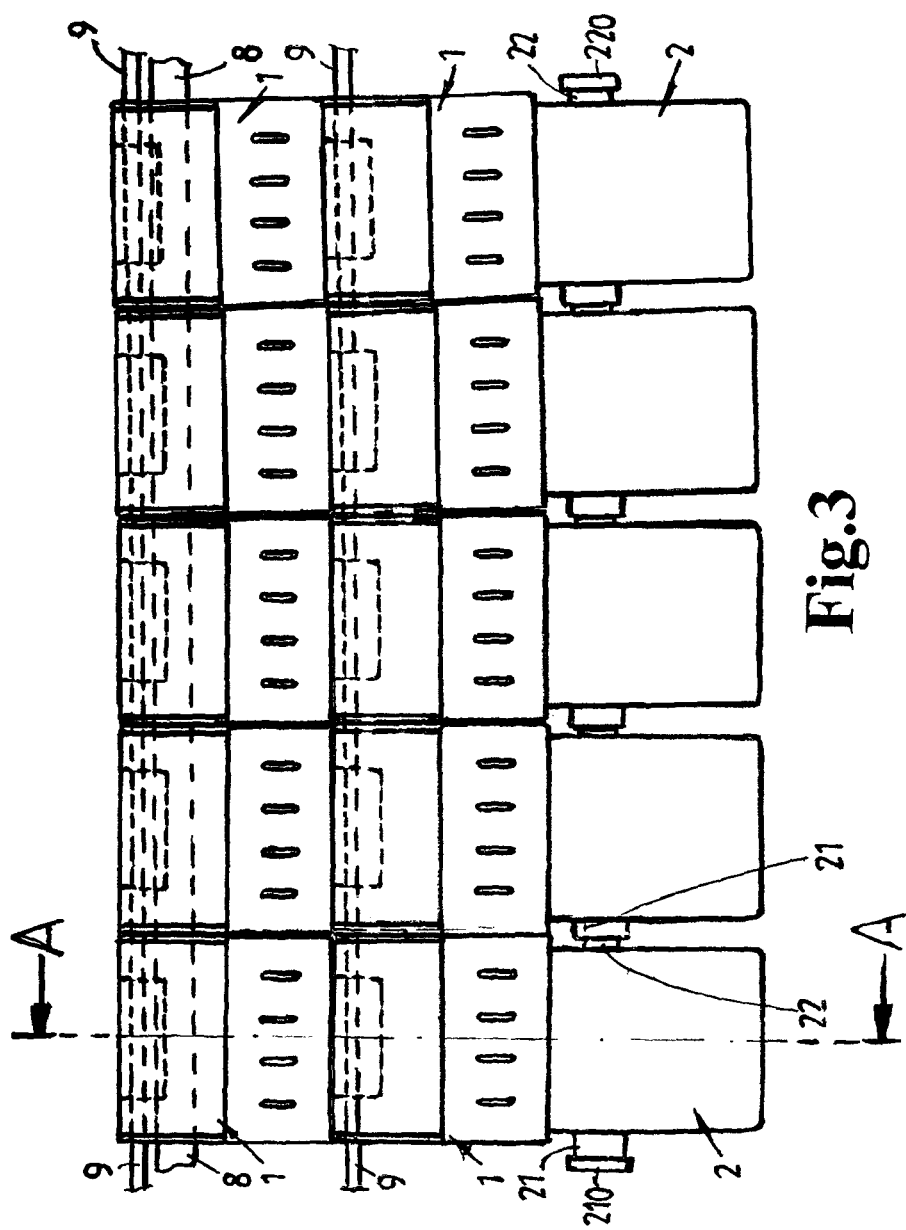

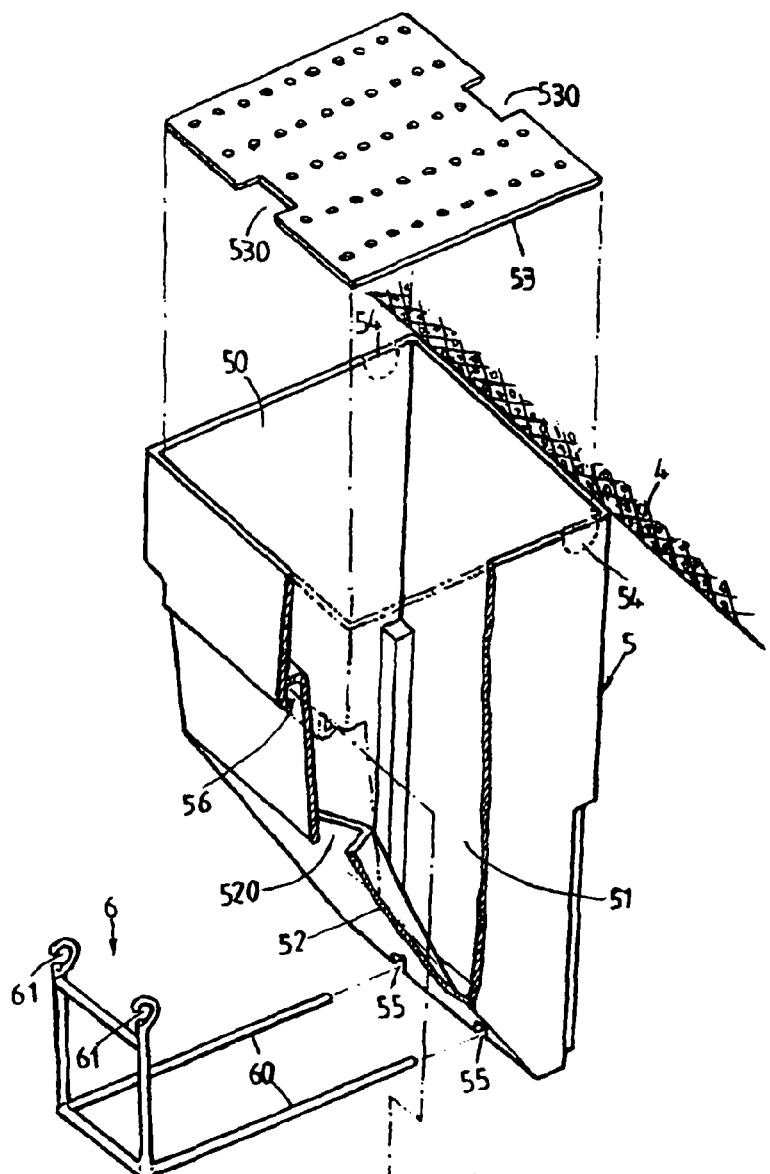
Prior Art Fig.5
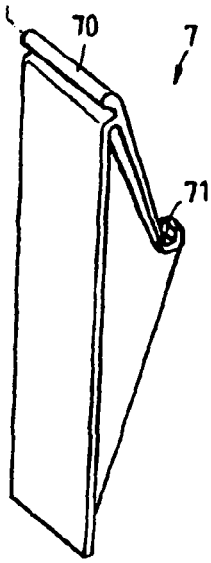

EXPANDABLE FLOWERPOT

FIELD OF THE INVENTION

The present invention relates to flowerpots, and in particular to a power-saving flowerpots capable of serial connecting with other flowerpot.

BACKGROUND OF THE INVENTION

Referring to FIGS. 5 and 6, the flowerpot body 5, the soil protecting frame 6 and the auxiliary frame 7 of a typical conventional flowerpot are illustrated.

The flowerpot body 5 has an approximate trapezoidal shape. The flowerpot body 5 has a planting tank 50 for planting plants, a water tank 51 below the planting tank 50 for collecting water and a water guide plate 52 below the water tank 51. A filter net plate 53 is installed in the planting tank 50. The surplus water in the planting tank 50 will flow into the water tank 51 for storage. When the water in the water tank 51 is full, the water will be guided from a notch 520 in the filter net plate 53 to another planting tank of another flowerpot body. The process can be repeated from the upper side to the lower side. Thus, an upper side of the water guide plate 52 is formed with the notch 520 having a triangular shape. Each of two opposite sides of the planting tank 50 is formed with a recess 54 for receiving a water tube 8. A backside of the planting tank 50 has a hook unit 56 for hooking to a net 9 of a wall 4 so that the wall has the flowerpot body 5 of the present invention and presents with a beautiful scenery.

The soil protecting frame 6 is formed by connecting two L shape rods 60 which are arranged in parallel. In assembly, the L shape rods 60 are arranged at two openings 55 at a bottom of the flowerpot body 5. An upper end of each L shape rod 50 is formed with a hook 61. When the hooks 61 hook to the net 9, one surface of the soil protecting frame 6 will press upon the lower side of the flowerpot body 5 so as to avoid soil to drain out. Another, it has the function of supporting the flowerpot body to have a stable structure, as shown in FIG. 5.

Referring to FIG. 7, the combination of the flowerpot body and the auxiliary frame according to the conventional flowerpot is illustrated. Other than suspending from a net, it can be assembled with the auxiliary frame 7 and then is placed upon a plane. The auxiliary frame 7 has an approximate triangular shape. An upper side of the auxiliary frame 7 has a connecting head 70 having a shape corresponding to that of the hooking unit 56 of the flowerpot body 5. A middle side of the auxiliary frame 7 is formed with an upward hook assembly 71. The connecting head 70 of the auxiliary frame 7 can be assembled to the hooking unit 56 of the flowerpot body 5 and the hook assembly 71 serves to be hooked to an notch 530 of the filter net plate 53 so that the auxiliary frame 7, flowerpot body 5 and the filter net plate 53 are combined as an integral body. Thus, by the structure, the flowerpot body 5 has a firm structure which can be positioned to a wall or a plane firmly.

SUMMARY OF THE INVENTION

Accordingly, the primary object of the present invention is to provide a power-saving flowerpots capable of serial connecting with other flowerpot. The plants or flowers can be planted on the horizontal plane 10 and the inclined plane 11. The water tubes at two sides of the flowerpot causes that a plurality of flowerpots can be connected as a row. Moreover, may rows can be arranged as a large planting plane. Thus water is saved and the work for watering is simplified.

To achieve above objects, the present invention provides a power-saving flowerpots capable of serial connecting with other flowerpot, comprising a planting tank having a horizontal plane and an inclined plane at an upper side thereof for planting plants and flowers; a water tank connected to a lower side of the planting tank; the connection of the planting tank and the water tank being formed as an L shape; an interior of the water tank being formed with a water draining channel; an upper side of the water draining channel being formed with a communication hole so that when the water level in the water tank is over a lower edge of the communication hole; water will flow into the communication hole 200 from the water tank; and wherein a plurality of flowerpot can be installed as a first row by a retaining rod to pass through all hooks of the flowerpots; the water tubes of the flowerpot are connected one by one.

Each of two lateral sides of the water tank is formed with a water tube. Sealing pads are used to seal the water tubes. A water absorption sheet is located from the water tank to the planting tank for absorbing water; and a lower side of the planting tank is formed with a plurality of water draining holes for draining water from the planting tank; a lower side of the planting tank installed with a plurality of strips for enhancing the structure of the planting tank; an upper side of the planting tank is formed with a recess for locating a water spraying tube; and a rear side of the planting tank is installed with a hook.

The various objects and advantages of the present invention will be more readily understood from the following detailed description when read in conjunction with the appended drawing.

BRIEF DESCRIPTION OF THE DRAWINGS

FIG. 1 is a perspective view of the present invention.
FIG. 2 is a schematic cross sectional view of the present invention.
FIG. 3 is a schematic view showing that a plurality of flowerpots of the present invention are arranged as a plane.
FIG. 5 is a partial cross sectional view of one prior art.

DETAILED DESCRIPTION OF THE INVENTION

Figure 4:
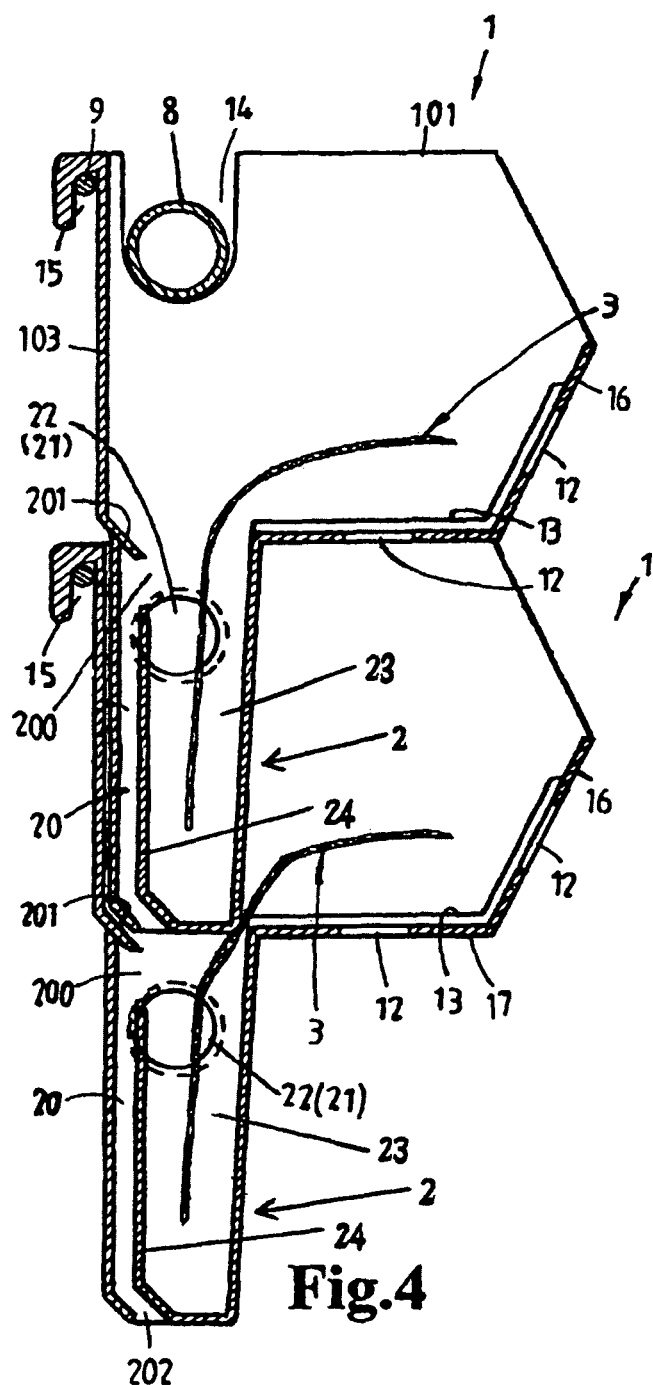
FIG. 4 is a schematic cross sectional view along the line A-A of FIG. 3.
Figure 6:
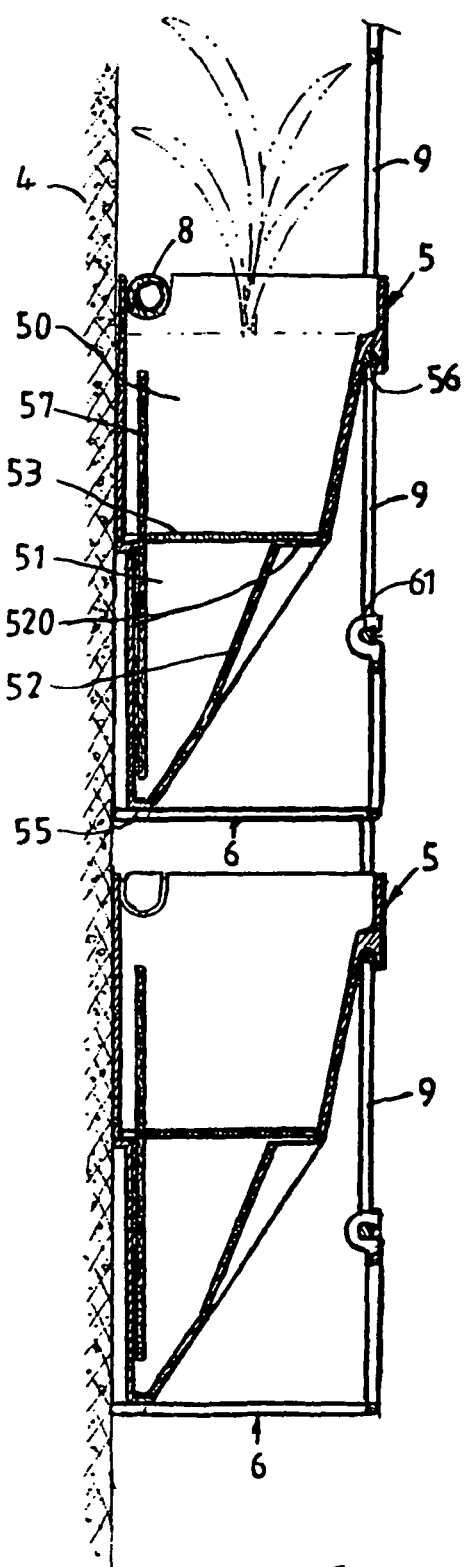
FIG. 6 is a longitudinal cross sectional view about the assembly of the prior art in FIG. 5.
Figure 7:
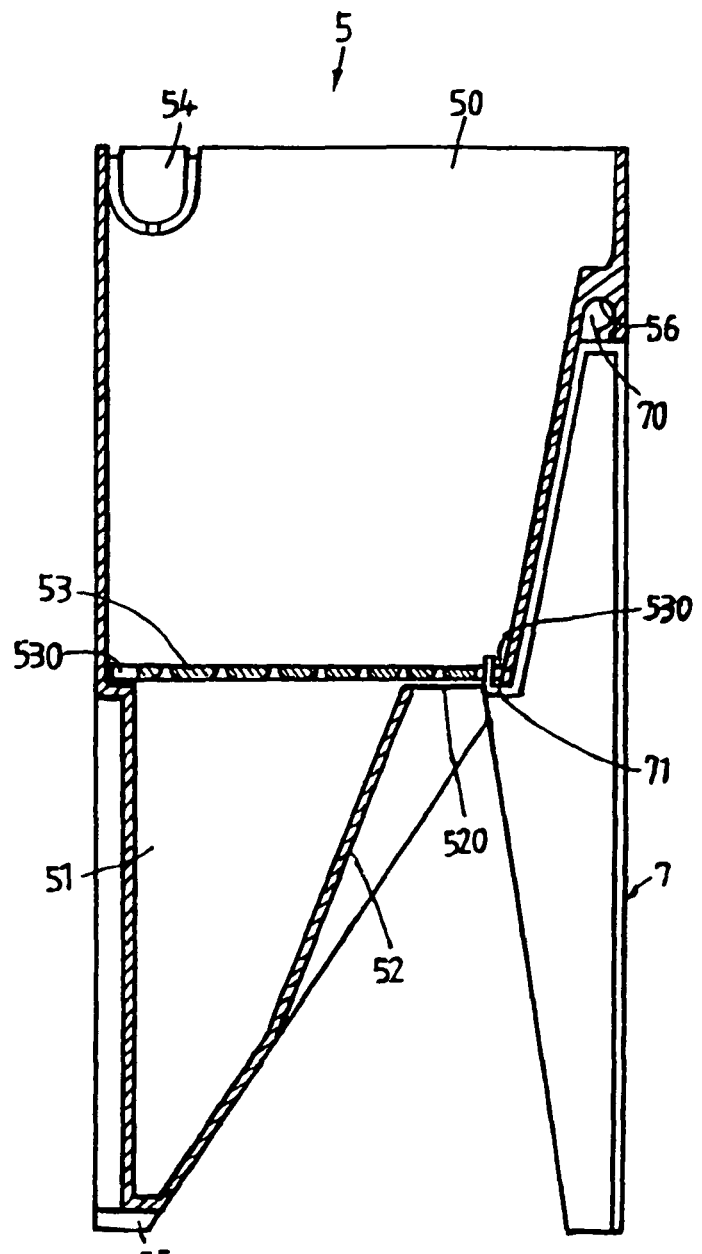
FIG. 7 is a longitudinal cross sectional view about the assembly of the prior art in FIG. 5.

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Referring to FIGS. 1 and 2, the flowerpot of the present invention is illustrated. The present invention includes the following elements.

A planting tank 1 is formed by two side walls 101, 102, a back 103, an inclined front plate 16 and a bottom 17. The bottom 17 and slant front plate 16 of the planting tank 1 are formed with a plurality of water draining holes 12 for draining water from the planting tank 1. A lower side of the planting tank 1 is installed with a plurality of ribs 13 for enhancing the structure of the planting tank 1. The two side walls 101, 102 of the planting tank 1 are separately formed with two recesses 14 for locating a water spraying tube 8 (see FIG. 4). The back 103 of the planting tank 1 is provided with a hook 15.

A water tank 2 is connected to the bottom 17 of the planting tank 1. The planting tank 1 and the water tank 2 are formed into an L-shape and the planting tank 1 communicates with the water tank 2. An interior of the water tank 2 is provided with a partition wall 24 to form a container 23 and a vertical water draining channel 20. An upper side of the water draining channel 20 is formed with an aperture 200 and a lower end of the water draining channel 20 is formed with an opening 202 at the bottom of the water tank 2. When the water level in the water tank 2 is over the aperature 200, the water will flow into the aperture 200 from the water tank 2. Each of two lateral sides of the water tank 2 is formed with a water tube 21 (22).

A water absorption sheet 3 is located from the water tank 2 to the planting tank 1 for absorbing water. A downward slant 201 is arranged over the aperture 200 of the water draining channel 20 to prevent water in the planting tank 1 from directly flowing into the water draining channel 20 through the aperture 200.

Referring to FIGS. 3 and 4, the application of the present invention is illustrated. In use, as illustrated in FIG. 3, a plurality of flowerpot can be installed as a first row by a retaining rod 9 to pass through all hooks 15 of the flowerpots. In that, the water tubes 21, 22 of the flowerpot are connected one by one. The sealing pads 210 and 220 can be used to seal the water tubes 21, 22 at the leftmost and rightmost sides of the row of the flowerpots. Then a second row of the flowerpot can be arranged below the first row. Thus according to this arrangement, a large amount of flowerpot can be expanded a plane.

The present invention provides a simple structure. In that, the planting tank 1 and the water tank 2 are formed with an L shape. The manufacturing cost is low. The plants or flowers can be planted in the planting tank 1. The water tubes at two sides of the flowerpot causes that a plurality of flowerpots can be serially connected in a row. Moreover, may rows can be arranged as a large planting plane. Thus water is saved and the work for watering is simplified.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A flowerpot comprising:

a planting tank, having a bottom, a back, two side walls and an inclined front plate; and a water tank, connected to the bottom of the planting tank to form an inverted L-shape, and completely communicating with the planting tank, an interior of the water tank being provided with a partition wall, wherein a container and a vertical water draining channel are formed in the water tank by the partition wall, and the vertical water draining channel is provided with an opening at a bottom of the water tank and an aperture in the water tank;

wherein each of two lateral sides of the water tank comprises a water tube, sealing pads are used to seal the water tubes, a water absorption sheet extends from the water tank to the planting tank for absorbing water, the bottom of the planting tank is formed with a plurality of water draining holes, the inclined front plate of the planting tank is formed with a plurality of water draining holes, the bottom of the planting tank is provided with a plurality of ribs, each of the two side walls of the planting tank is formed with a recess, the back of the planting tank is provided with a hook, and a downward slant is arranged over the aperture of the vertical water draining channel.

\* \* \* \* \*